Sept. 4, 1945.　　　　　G. P. OGG　　　　　2,383,985
REAR MOUNT FOR FIXED MACHINE GUNS
Filed Feb. 4, 1944
FIG. 1
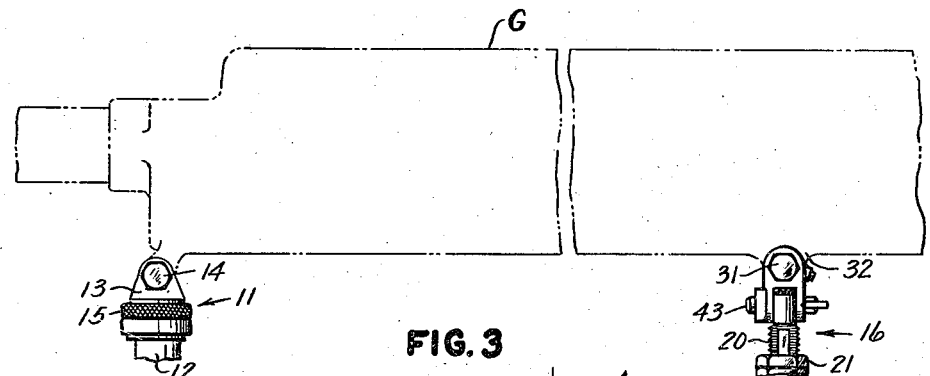
FIG. 2
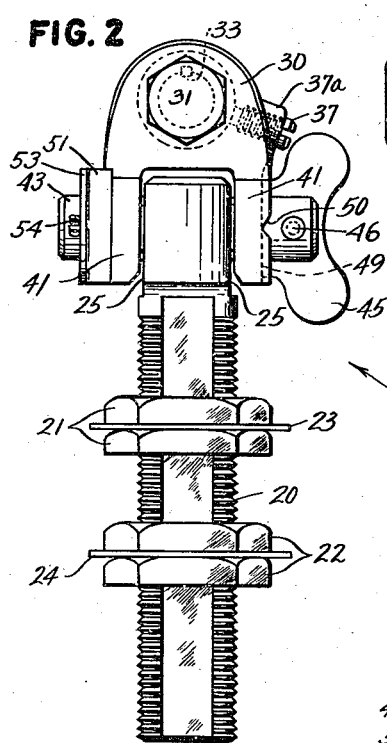
FIG. 3
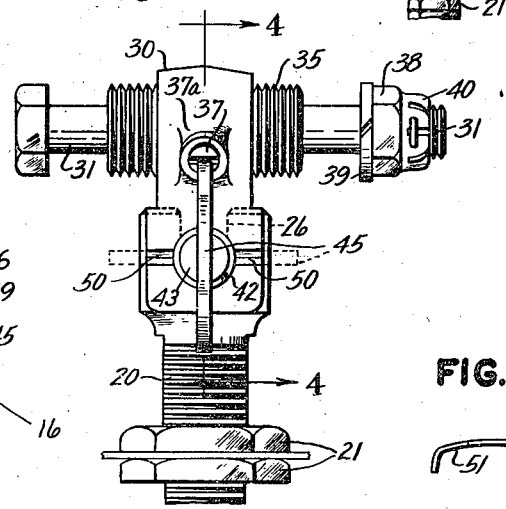
FIG. 6
FIG. 4
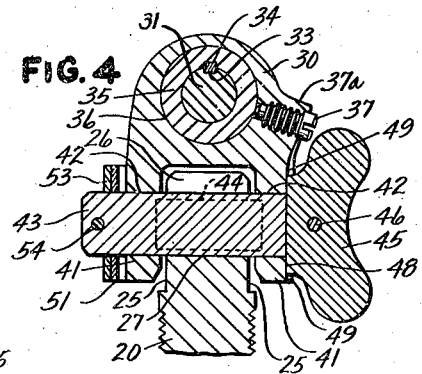
FIG. 5
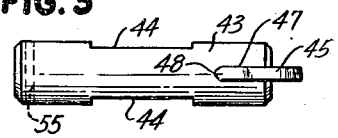
INVENTOR
GEORGE P. OGG
BY
ATTORNEYS Patented Sept. 4, 1945

2,383,985

UNITED STATES PATENT OFFICE 2,383,985

REAR MOUNT FOR FIXED MACHINE GUNS

George P. Ogg, Springfield, Ohio

Application February 4, 1944, Serial No. 521,100

2 Claims. (Cl. 89—37.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the rear mounts for fixed machine guns, such as are commonly installed on aircraft, especially interceptor or fighter airplanes.

Objects of the invention are to provide a rear mount which is easily installed, which permits quick attachment and detachment of the machine gun, and which allows for any misalignment that may exist between the airplane parts which support the front and rear mounts of the machine gun, so that no severe stresses are imposed on the rear mount, and the gun may be fired indefinitely without failure of said mount or the connections therewith.

The present type A-4 quick detachable rear gun mount for the Browning caliber .50 machine gun comprises, in general, a screw threaded post which is attached to the airplane part that provides the support, a holder attached by a bolt to two perforated ears depending from the receiver assembly of the gun, and a ball locking joint comprising three steel balls which lock the holder to the post in one position, and release the holder in another position, the releasing being effected by turning a knurled collar through 90° against a torsional spring. A general idea of this construction may be obtained by referring to the Hofstetter Patent No. 1,939,699, dated December 19, 1933, which, however, differs in that the collar controlling the locking balls is slidable instead of oscillatable.

The gravest objection to the type A-4 mount (also to the Hofstetter construction) is that no provision is made for taking care of misalignment between the front and rear mounts. In cases where the front and rear mounts are bolted to a single casting, misalignment is less likely to occur; but when the machine guns are mounted, for example, in the wings of airplanes, especially pursuit or fighter planes, the very light metal to which the machine gun mounts are secured is almost certain to become slightly twisted or bent under the terrific stresses encountered in military maneuvers and in battle; so that the armorer is compelled to use force in attempting to install a replacement gun, which puts the mount under a constant stress that is greatly augmented by the reaction on the mount from recoil forces due to the firing of the gun. The result is that the rear mount either breaks loose entirely or else moves about during firing, which destroys the accuracy of the gun and may even damage the airplane. Attempts have been made to minimize the likelihood of misalignment developing in the gun supporting means by adding stiffening members to the interior of the airplane wing (which is objectionable because of the added weight and because of the considerable cost of such operations and the fact that the airplane is grounded while the operations continue), and by adding clamps and safety wires to the rear mount, to prevent disconnection thereof, but the latter expedient has proved to be highly unsatisfactory, as the mounts have continued to fail.

The accompanying drawing shows the embodiment of the invention now preferred by me. In said drawing—

Fig. 1 is a side elevation showing in phantom part of a machine gun supported on a standard front mount and on a rear mount made in accordance with the invention, portions of both mounts being omitted;

Fig. 2 is an elevation, in full size, showing the entire rear mount;

Fig. 3 is an elevation of the same omitting the lower portion of the post, the mount being viewed from the right side of Fig. 2;

Fig. 4 is a longitudinal section on line 4—4 of Fig. 3;

Fig. 5 is a detail elevation of the locking pin per se; and

Fig. 6 is a detail elevation of the spring which cooperates with the locking pin of Fig. 5 to hold the pin in the desired position.

Referring particularly to the drawing, the machine gun G is shown in Fig. 1 as supported by a type A-3 gun mount 11, at the forward end of the receiver assembly, said gun mount comprising a post 12 adapted to be secured to the airplane or other support, a U-shaped adapter 13 secured by bolt 14 to the receiver assembly, and a locking collar 15 which is turned about 90° against the resistance of a torsional spring (not shown) to release three locking balls (not shown) which lock the post and adapter together. A more detailed description is omitted as the type A-3 gun mount forms no part of the present invention. It is important to understand that gun mount 11 is designed to absorb the entire recoil of the gun and provides a support permitting elevation or azimuth adjustment of the gun about the axis of bolt 14 or about the axis of post 12 respectively, while the rear gun mount 16 (which is the invention herein described) is essentially a steady rest and may be manipulated to provide both elevation and azimuth adjustment of the gun, and in addition, may compensate for any misalignment of the supports, as will be made clear.

Referring to Figs. 2, 3 and 4, the rear mount 16 comprises a screw threaded post 20 adapted to be secured to an airplane or other support by means of nuts 21, 22 and washers 23, 24. The upper end of the post is free of screw threads and has two flattened faces 25 on opposite sides. At its upper extremity, the post has a transverse slot 26 opening from the top, and a transverse bore 27 open to the slot and extending between the flattened faces 25. The bore 27 has a diameter larger than the width of the slot. Thus, the upper end of the post is bifurcated and may receive a locking pin, as will be explained.

A holder 30 is adapted to be secured to the gun G by means of a bolt 31 which passes through two spaced perforated lugs 32 (only one of which is shown) depending from the receiver assembly. Bolt 31 preferably has a longitudinal slot 33 to receive a key 34 fixed to the interior of a hollow sleeve 35 which has screw threads on its exterior to engage a tapped bore 36 in the holder. Thus rotation of bolt 31 will cause the sleeve 35 to move in one direction or the other through the holder, but irrespective of the position of the sleeve in the holder, the bolt is slidable relative to the sleeve to permit the bolt to be drawn up tight when attaching the gun to the gun mount, also to permit withdrawal of the bolt by hand when disassembling the gun mount. However, the spaced lugs 32 snugly fit in the spaces between the head of the bolt and one end of screw-threaded sleeve 35, and washer 39 and the other end of sleeve 35, so that bolt 31 cannot slide at all when the parts are fully assembled. The sleeve is clamped relative to the holder by means of a set screw 37 threaded into a boss 37a in the holder, the set screw preferably having a flat end (Fig. 4) and being self locking and shake-proof. A nut 38, lock washer 39 and lock nut 40 complete the assembly for attaching the gun to the mount.

Depending from the holder are two spaced parallel lugs 41 having aligned circular bores 42 to receive a locking pin 43. The locking pin is of generally circular cross section but has flattened areas 44 on diametrically opposite sides, and these areas lie between the lugs 41, so that round portions of the locking pin may turn within the circular bores 42. The locking pin is thus rotatable and slidable on the holder. A flat metal thumb-piece 45 is secured by cross pin 46 within a slot 47 cut into one end of the locking pin and has projections 48 adapted to be received in notches cut in the outer vertical face of one of the lugs 41. These notches are arranged as two spaced aligned notches 49 on opposite sides of bore 42, and two aligned spaced notches 50 at right angles to notches 49 and likewise located on opposite sides of bore 42. A sheet metal spring 51, shown separately in Fig. 6, has a bore 52 adapting it to fit over the locking pin, and a washer 53 holds the spring in position, being in turn held on the locking pin by a cotter pin 54 or, if preferred, by a cross pin (not shown) secured by a press fit in cross bore 55. The spring 51 tends to pull the locking pin to the left as the parts are viewed in Figs. 2 and 4, and hence holds the projections 48 seated in the notches 49 or 50, as the case may be. The locking pin is locked against turning when projections 48 are seated in said notches.

As Figs. 2 and 4 show, the lugs 41 are spaced apart sufficiently to slip freely over the flattened upper end of the post. If the locking pin is turned so that its flattened areas 44 are vertical, the locking pin will pass laterally through the slot 26 in the top of the post before the locking pin seats in the bore 27. By turning the locking pin 90°, it will move out of the notches 50 and into the notches 49, which brings the round portion of the locking pin under the slot 26, thereby rigidly locking the holder to the post. Another turn of 90° will bring the flattened areas around until they are beneath the walls of slot 26, whereupon the gun assembly may be lifted and the locking pin will slide out through said slot to release the parts. Obviously the described construction provides a manually releasable, quick-detachable lock for the holder and post.

One of the features of the invention is that the locking and unlocking are dependable. Another is the ease of assembly and disassembly which will be obvious without further description. After exhaustive field tests by the Army air forces, the device of the present invention has been adopted as standard equipment and is known as the type A-5 gun mount.

The outstanding advantage of my gun mount is the fact that any misalignment which may be encountered is taken care of without stressing or straining the mount or the parts to which it is attached. If the rear mount is so supported that post 20 leans slightly rearward relative to the gun, the holder and bolt assembly is slidable forwardly, pivoting about bolt 31 to compensate for this. Forward leaning of post 20 is compensated by rearward sliding and pivoting of the holder. The gun is free to rock on the post through a small angle because the top of the post is spaced from the bottom of the holder (between the lugs). Furthermore, the gun may be adjusted in azimuth at any time by merely loosening the set screw 37 and turning the sleeve 35 by means of the bolt 31, then tightening the set screw to hold the adjustment. Elevation and depression adjustment of the gun is of course effected by the screw threaded post 20. The small spaces shown in Fig. 2 as lying between the inner faces of lugs 41 on the holder, and the flattened faces 25 at the top of the post, are of considerable importance when assembling the gun on the forward and rear gun mounts, because these spaces permit taking care of slight differences in the airplane structure which supports the gun mounts; also take care of slight variations in the position of the front gun mount relative to the rear gun mount, and also take care of manufacturing tolerances in the gun itself. In the .50 cal. Browning machine gun, the manufacturing tolerance is ±.020 in. in the distance between the centers of the front and rear mounts. The described gun mount may however be used with any caliber of machine gun.

While for convenience the terms "vertical," "elevation" and "azimuth" have been used, it will be understood that machine guns are frequently mounted at an angle to the vertical, and a normal elevational movement may have a component of azimuth while a normal azimuth adjustment may have a component of elevation. Various combinations of the several adjustments are possible to make the rear mount merely a steady rest for the gun, with practically no stresses tending to loosen the connections. The low stresses to which the mount is subjected are easily taken care of by the rugged design of the parts.

What I claim is:

1. A rear gun mount for machine guns comprising, in combination, a post adapted to be secured in an upright position on an airplane or other support, said post having its upper end bifurcated, with a transverse slot open to the upper end and a transverse bore, of larger diameter than the width of the slot, located below and open to the slot; means for adjustably securing the post upon said support; a holder; means for connecting the holder with the gun; a locking pin on the holder adapted to pass laterally through the slot when turned to a certain angular position; said locking pin locking in the bore when turned through a predetermined angle from the position it had when it was passed through the slot but being slidable in the bore when so locked; and manually releasable means to secure the locking pin in various angular positions; the locking pin permanently securing the post and holder in properly assembled relationship, when locked in said transverse bore; said holder having two depending lugs with aligned bores for receiving said locking pin, said lugs being spaced apart a distance greater than the width of the top of the post so that the holder may have limited rectilinear movement on the post as determined by the sliding fit of the locking pin in said transverse bore and as limited by contact of the inside faces of the lugs with the post; said holder also being spaced above the top of the post when the parts are assembled, the last mentioned spacing permitting rocking of the holder and hence of the gun relative to the post, said rocking being about the longitudinal axis of the locking pin; said locking pin axis being below and substantially parallel to the longitudinal axis of the gun when connected to said holder.

2. A gun mount comprising, in combination, supporting means adapted for direct and rigid attachment to an airplane or other support; means to adjust the supporting means to effect vertical adjustment of the gun; clamping means mounted on the supporting means for securing the gun to the supporting means; said clamping means being rockable about a horizontal axis which is parallel to the vertical plane coinciding with the longitudinal axis of the gun; means forming part of the gun clamping means and constructed and arranged so that the latter is adjustable in the straight line laterally relative to the gun, to move the gun in azimuth; and means interposed between the gun clamping means and the supporting means and constructed and arranged to permit slight straight line movement of the gun, when clamped, relative to the supporting means and in said vertical plane.

GEORGE P. OGG.